United States Patent [19]

MacFarlane

[11] Patent Number: 4,463,816

[45] Date of Patent: Aug. 7, 1984

[54] LOAD CELL ASSEMBLY FOR CONVEYOR WEIGHING OF BULK MATERIAL

[75] Inventor: John L. MacFarlane, Modesto, Calif.

[73] Assignee: AutoWeigh Co., Modesto, Calif.

[21] Appl. No.: 476,770

[22] Filed: Mar. 18, 1983

[51] Int. Cl.³ .................... G01G 13/02; G01G 19/00; G01G 21/12; G01G 11/00

[52] U.S. Cl. .................................. 177/119; 177/145; 177/255; 198/504

[58] Field of Search ............... 198/504, 505; 177/119, 177/120, 121, 145, 255

[56] References Cited

U.S. PATENT DOCUMENTS 3,331,457 7/1967 Blubaugh .................... 198/504 X
4,284,155 8/1981 Söderholm .................... 177/255 X

FOREIGN PATENT DOCUMENTS

WO82/04123 11/1982 PCT Int'l Appl. ............ 177/145

Primary Examiner—E. A. Goldberg
Assistant Examiner—Patrick W. Foster
Attorney, Agent, or Firm—Manfred M. Warren; Robert B. Chickering; Glen R. Grunewald

[57] ABSTRACT

A bulk material weighing apparatus 10, according to the present invention, includes a weigh frame 12 that is suspended within a conveyor frame 20 by three load cells 14, 16, and 18. The weigh frame has idler rollers 50, 52, 54, and 56 that are so positioned to be level with respect to corresponding rollers 34 and 36 of the conveyor frame. A conveyor belt 22, for transporting the bulk material 24 to be weighed, is supported by the rollers of both the conveyor and the weigh frames. The weight of the material conveyed by the conveyor belt is transferred to the load cells by the weigh frame. Material weight is found by summing the force outputs of the three load cells. The load cells are preferably positioned such that each load cell reacts one third of the weight of the material when uniformly distributed upon the conveyor belt.

5 Claims, 5 Drawing Figures

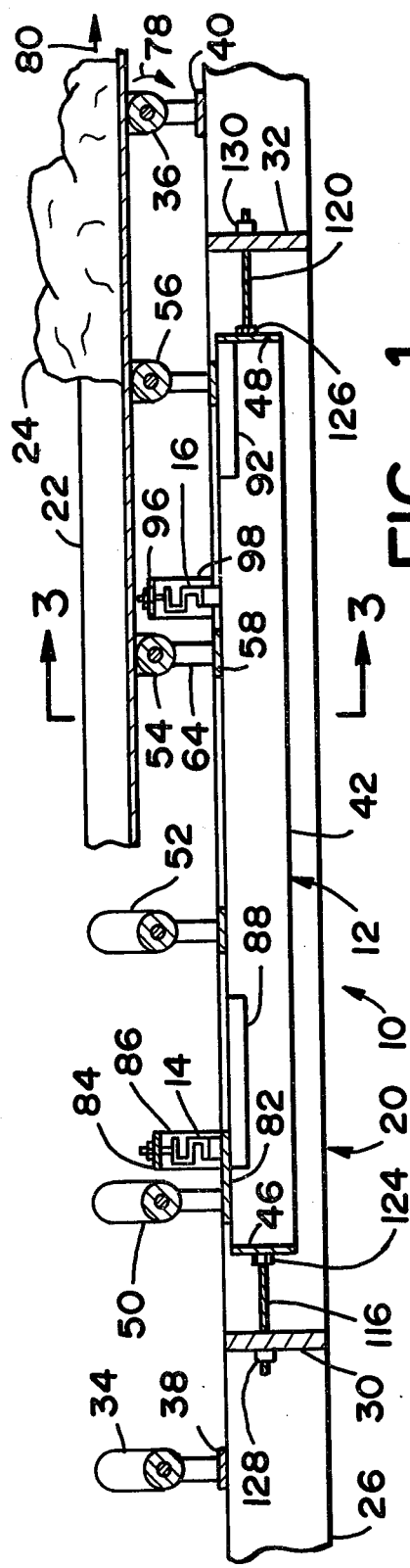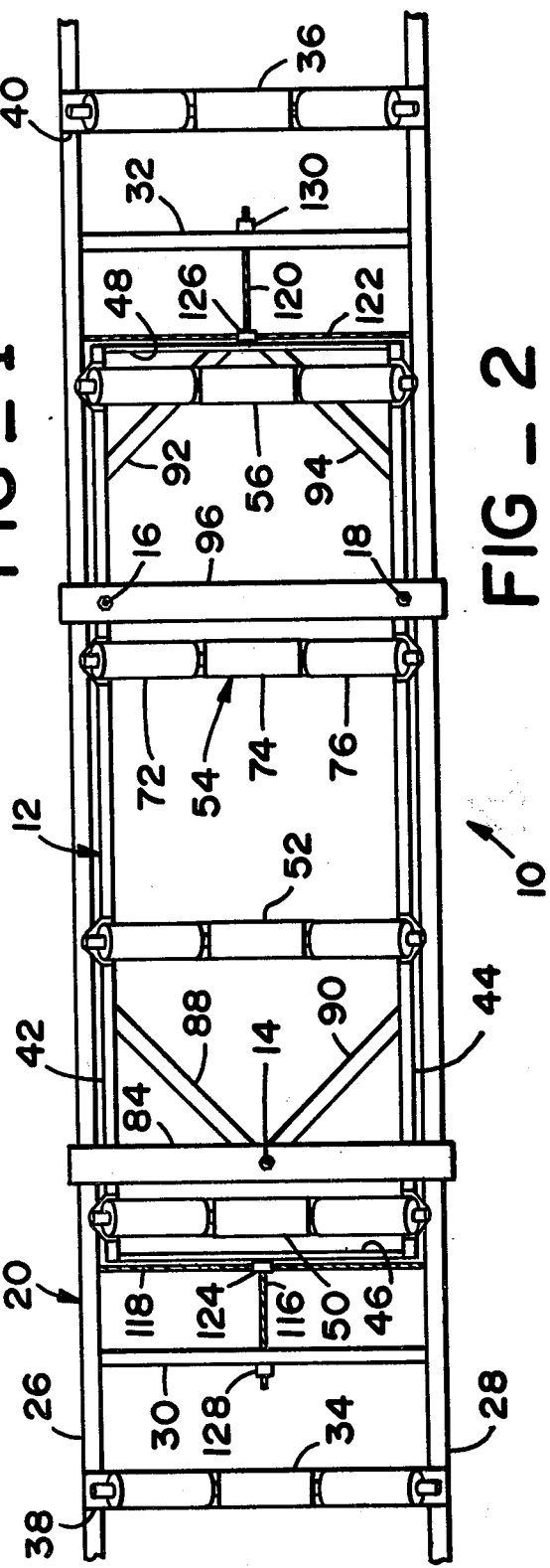

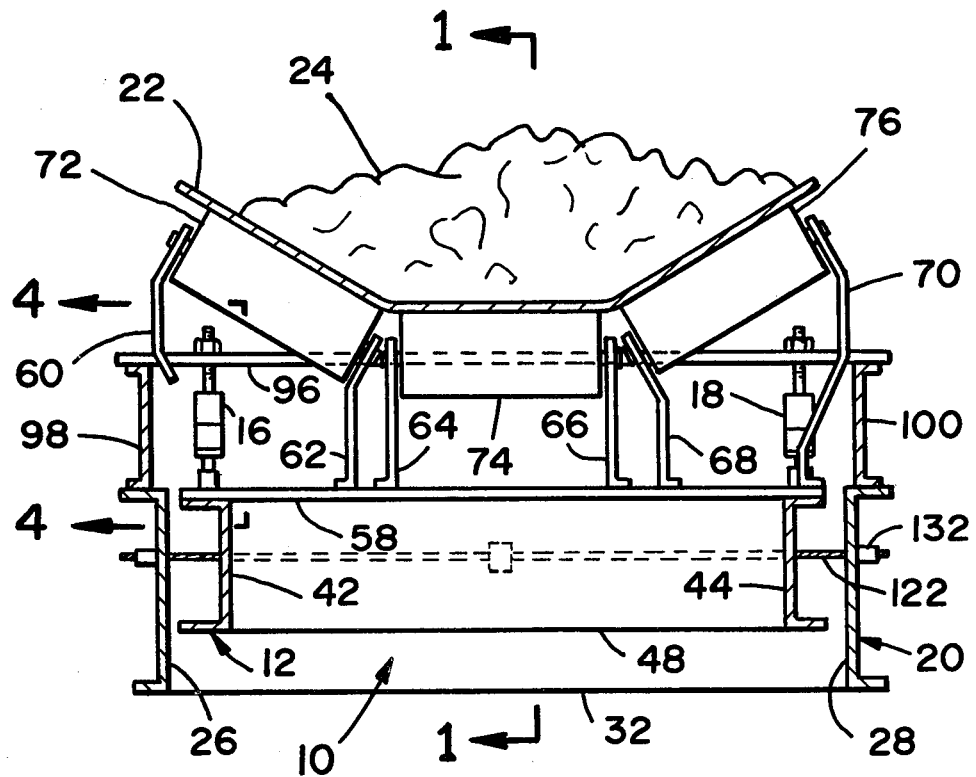
FIG_3
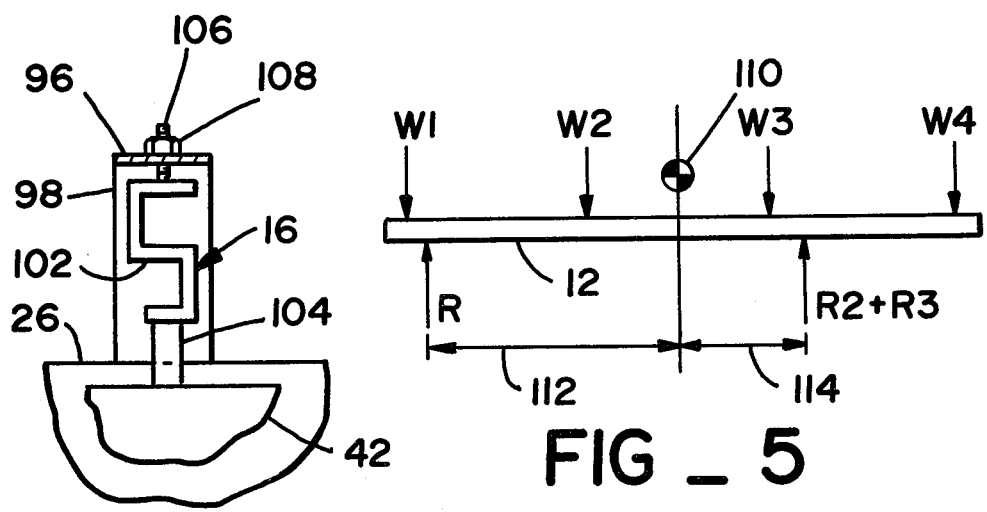
FIG_4
FIG_5

LOAD CELL ASSEMBLY FOR CONVEYOR WEIGHING OF BULK MATERIAL

BACKGROUND OF THE INVENTION

The present invention relates generally to apparatus for weighing bulk material, and relates more specifically to a weighing apparatus for weighing bulk material transported by a conveyor belt.

The accurate weight measurement of bulk materials transported by belt-type conveyors is necessary for proper accounting and processing of the materials. Apparatus for weighing bulk materials on conveyor belts, known in the prior art, typically included a weighing section that was suspended from the conveyor system by four or more load cells. The weight of the material on the conveyor was continuously monitored by summing the force outputs of the load cells as the material was conveyed past the weighing section.

Several disadvantages inherent in prior art bulk material weighing apparatus have been encountered. One disadvantage was the excessive time that was required for the initial set-up and load calibration. A time-consuming adjustment process was necessary to evenly distribute the weight of the weighing section and the material carried thereby among all load cells. Because of the rigidity of the weighing section, a mis-adjusted load cell would carry a disproportionate share of the load thus reducing the weighing accuracy of the apparatus. Replacement of a malfunctioning load cell required that the time-comsuming adjustment process be repeated. Another related disadvantage was that the weighing accuracy of these prior art weighing apparatus was related to operating temperature. A change in the ambient temperature tended to dimensionally warp the welded weighing section. This warpage caused uneven loading of the load cells and a corresponding loss in weighing accuracy. The economic importance of eliminating such inaccuracies is substantial since the volume of material being weighed on belt-type conveyors is very substantial and even small errors will result in very sizeable cost differences.

SUMMARY OF THE INVENTION

A. Objects of the Invention

Accordingly, it is an object of the present invention to provide an improved apparatus for weighing bulk material that evenly distributes the weight of the material between the load cells automatically.

It is another object of the present invention to provide an improved-accuracy weighing apparatus that minimizes the necessity for vertical adjustment of the load cells.

It is a further object of the present invention to provide an improved-accuracy weighing apparatus that minimizes the effect of temperature variations upon weighing accuracy.

It is still another object of the present invention to provide a load cell assembly for a belt conveyor or the like which is relatively easy to set up and calibrate, is durable, can be added to existing conveyors, and is constructed to enable the use of conventional load cells.

B. Brief Summary of the Invention

A bulk material weighing apparatus, according to the present invention, includes a weigh frame that is suspended within a conveyor frame by three load cells. The weigh frame has sets of idler rollers that are so positioned to be level with respect to corresponding rollers of the conveyor frame. A conveyor belt, for transporting the bulk material to be weighed, is supported by the rollers of both the conveyor and the weigh frame. The weight of the material conveyed by the conveyor belt is directly transferred to the conveyor frame except for the weight of the material positioned above the weigh frame which is transferred to the three load cells. Material weight is found by averaging the force outputs of the three load cells. Preferably, load cells are positioned such that each load cell reacts one third of the weight of the material when uniformly distributed upon the conveyor belt.

Other features of the present invention include lateral constraints and turnbuckles. Wire rope disposed horizontally acts to laterally constrain the movement of the weigh frame while allowing all vertical loads to be sensed by the load cells. Turnbuckles incorporated into the load cell mounts permit adjustment of the weigh frame to align the weigh frame rollers with the conveyor rollers.

The bulk material weighing apparatus of the present invention has other objects and features which will be apparent from and are set forth in more detail in the accompanying drawing and the following description of the preferred embodiment.

DESCRIPTION OF THE DRAWING

FIG. 1 is a sectional view looking in a horizontal direction of a weigh frame and load cells of a bulk material weighing apparatus constructed according to the present invention.

FIG. 2 is a plan view of the weighing apparatus of FIG. 1 and is shown without a conveyor belt in place.

FIG. 3 is a sectional view across the width of the weighing apparatus of FIG. 1 and is taken substantially along the plane of line 3—3 of FIG. 1.

FIG. 4 is an enlarged, fragmentary view of a load cell and mounting therefor according to the weighing apparatus of FIG. 1.

FIG. 5 is a free-body force diagram showing weight and reaction forces according to the weighing apparatus of FIG. 1.

DESCRIPTION OF THE PREFERRED EMBODIMENT

In reference now to FIGS. 1, 2, and 3, the construction of a bulk material weighing apparatus 10 according to the present invention will now be described. Apparatus 10 primarily comprises a weigh frame, generally designated 12, and three load cells 14, 16, and 18. Weigh frame 12 is positioned within a conveyor frame 20 and supports a portion of a belt-type conveyor 22 which carries the bulk material 24 to be weighed. Load cells 14, 16, and 18 provide a three point mounting to the conveyor frame for the weigh frame through which all vertical loads are transferred. The weight of the portion of the bulk material that is supported by the weigh frame is determined from force readings of the load cells.

Conveyor frame 20 and conveyor belt 22 form belt-type conveying means which transports the bulk material 24. The conveyor frame includes two horizontal side channels 26 and 28 which are joined together periodically by spacers 30 and 32. Rotatably mounted to the top of the side channels are idler roller units 34 and 36 which support the conveyor belt 22. Each roller unit may advantageously include three cylindrical rollers mounted to a mounting base 38 and 40, which spans the distance between and attaches to the side channels.

Weigh frame 12 supports a portion of conveyor belt 22 and is supported in turn by the three load cells. The weigh frame is a rectangular weldment fabricated from two side channels 42 and 44 and two end plates 46 and 48 and is positioned within the conveyor frame 20 in the area between side channels 26 and 28 and spacers 30 and 32. The weigh frame supports four idler rollers units 50, 52, 54, and 56 which are similar in form and function to the previously described roller units 34 and 36. Each weigh frame roller unit includes a mounting base 58 attached to both weigh frame side channels 42 and 44, three pairs of brackets 60, 62, 64, 66, 68, and 70 mounted to base 58, and three rollers 72, 74, and 76 each dispersed between a respective pair of brackets. All roller units, whether attached to the weigh frame 12 or the conveyor frame 20, are arranged in line with each other so that each roller unit supports an equal portion of the material weight. The three rollers of each roller unit form a concave shaped support for the conveyor belt. The rollers are free to rotate about their axes in the direction shown by arrow 78, thus allowing the belt to move freely in the direction shown by arrow 80.

Preferably, load cells 14, 16, and 18 are arranged so as to equally divide the weight of weigh frame 12 and material 24. In the assembly shown, load cell 14 is located along the centerline of conveyor belt 22 to support one end of the weigh frame. The lower part of load cell 14 attaches to the weigh frame through a mounting base 82 which is also used to mount roller unit 50. The upper part of load cell 14 is adjustably coupled to the conveyor frame through a cross plate 84 which attaches to each side of the conveyor frame with two mounting channels 86. Two cross braces 88 and 90 are attached to side channels 42 and 44 and to mounting base 82 to stiffen the weigh frame at that point. Two additional cross braces 92 and 94 similarly stiffen the opposite end of the weigh frame.

Preferably, lead cells 16 and 18 are located equidistant from the centerline of the conveyor belt at opposite lateral edges thereof to support the other end of the weigh frame. The lower part of load cells 16 and 18 are attached to side channels 42 and 44 respectively of the weigh frame. The upper portions of load cells 16 and 18 are adjustably coupled to the conveyor frame through a cross plate 96 which attaches to each side of the conveyor frame with two mounting channels 98 and 100.

Load cell 16 and its installation are shown in greater detail in FIG. 4. A load sensing element 102 attaches to side channel 42 through a flexure 104 disposed at the lower portion of element 102. A screw thread 106, fitted through a clearance hole in cross plate 96 and capped by a nut 108, adjustably couples the upper portion of element 102 to the cross plate. The height of the weigh frame with respect to the conveyor frame can be adjusted at each load cell by adjusting the position of nut 108 of each load cell. This method of mounting the three load cells provides height adjustment means for aligning the roller units of the weigh frame with those of the conveyor frame to insure proper load distribution.

The primary advantage of the present invention is that by providing only three load cells, the distribution of load between load cells is statically determinant, thus improving weighing accuracy. FIG. 5 shows a free-body diagram of weigh frame 12 which is useful in determining the relatively spaced apart triangular relation of the load cells. Four equal vertical loads, W1, W2, W3, and W4, represent the weight of the conveyor belt and uniformly distributed bulk material thereon that is transferred to the weigh frame through the roller units. Three equal vertical loads, R1, R2, and R3, represent the desired reaction loads of load cells 14, 16, and 18 respectfully. If the center of loads W1, W2, W3, and W4 is at point 110, then the distance 112 from point 110 to load cell 14 is equal to twice the distance 114 from point 110 to the longitudinal position of load cells 16 and 18. As described above, load cell 14 is at the centerline of the conveyor belt and load cells 16 and 18 are equally spaced from the centerline proximate opposite lateral edges of the conveyor belt. This positioning evenly distributes the weight to be measured among all three load cells. Of course, the bulk material is rarely uniformly distributed upon the conveyor belt, but on the average, each load cell will measure one third of the weight.

The three load cell assembly of the present invention greatly reduces the time for set-up and calibration as compared to conventional four cell weighing assemblies. Thus, calibration of the assembly shown in the drawing can be accomplished in an hour or less, as compared to one to two days for prior apparatus. When load cells have a typical range of displacement of only 0.005 inches, the problems of evenly distributing weight between four cells are extreme. The load cell assembly of the present invention is extremely accurate. It can weigh bulk material with 0.1% error or less over 100 tons of material. The triangular assembly also tends to minimize temperature sensitivity because any distortion of the weigh frame as a result of temperature gradients tends to be more evenly distributed then is possible in a four cell system.

Returning now to FIGS. 1, 2, and 3, means for constraining the lateral movement of the weigh frame will be described. As explained above, the three load cells 14, 16, and 18 vertically support weigh frame 12. Lateral constraint is additionally needed to prevent the weigh frame from swinging in response to vibrational inputs. Toward this end, cables 116, 118, 120, and 122 are attached to the weigh frame by two clamps 124 and 126, one at each end of the weigh frame. Cables 116 and 120 are disposed longitudinally and are coupled to spacers 30 and 32 of conveyor frame 20. Cables 118 and 122 are disposed laterally and are coupled to side channels 26 and 28 of the conveyor frame. In each case, the cables passes through a mounting hole and is retained on the moutning hole's opposite side by clamps 128, 130, and 132.

What is claimed is:

1. Apparatus for weighing material moving on a belt-type conveyor, said apparatus including a conveyor frame, a weigh frame disposed within said conveyor frame, belt-type conveying means movably supported by said conveyor frame and said weigh frame for moving said material, and load cell means coupled to and disposed between said conveyor frame and said weigh frame for sensing the weight of said material on the portion of said belt-type conveying means that is supported by said weigh frame, wherein the improvement in said apparatus comprises:

said load cell means consists of three load cells positioned in relatively spaced apart triangular relation for supporting said weigh frame and for measuring the weight of said material supported thereby.

2. Apparatus as defined in claim 1 wherein,
said three load cells are disposed so that each load cell supports one third of the weight of said material supported by said weigh frame when said material is uniformly distributed on said conveying means.

3. Apparatus as defined in claim 2 wherein,
one of said three load cells is disposed on the centerline of said conveying means at one end of said weigh frame, and each of the other two load cells is disposed proximate opposite lateral edges of said conveying means at a distance from said end equal to two thirds of the length of said weigh frame.

4. Apparatus as defined in claim 1 further comprising means for constraining the lateral movement of said weigh frame.

5. Apparatus as defined in claim 1 wherein,
said load cell means includes height adjustment means for adjustably coupling each of said load cells to said conveyor frame.

* * * * *